(12) United States Patent
Xiao et al.

(10) Patent No.: US 10,948,914 B2
(45) Date of Patent: Mar. 16, 2021

(54) SYSTEM AND METHOD FOR PROVIDING AN AUTONOMOUS DELIVERY VEHICLE WITH INTELLIGENT RAMP CONTROL

(71) Applicant: AUTOX, INC., Grand Cayman (KY)

(72) Inventors: Jianxiong Xiao, San Jose, CA (US); Zhuo Li, San Jose, CA (US)

(73) Assignee: AUTOX, INC., Grand Cayman (KY)

( * ) Notice: Subject to any disclaimer, the term of this patent is extended or adjusted under 35 U.S.C. 154(b) by 0 days.

(21) Appl. No.: 16/041,272

(22) Filed: Jul. 20, 2018

(65) Prior Publication Data

US 2020/0026281 A1 Jan. 23, 2020

(51) Int. Cl.
*G05D 1/00* (2006.01)
*B60P 3/00* (2006.01)
*B60P 1/43* (2006.01)

(52) U.S. Cl.
CPC .............. *G05D 1/0088* (2013.01); *B60P 1/43* (2013.01); *B60P 3/007* (2013.01); *G05D 2201/0207* (2013.01)

(58) Field of Classification Search
CPC . G05D 1/0088; G05D 2201/0207; B60P 1/43; B60P 3/007
See application file for complete search history.

(56) References Cited

U.S. PATENT DOCUMENTS

| 2018/0311085 A1* | 11/2018 | Lacaze | A61G 3/061 |
| 2019/0220044 A1* | 7/2019 | Ruth | B60P 3/06 |
| 2019/0329691 A1* | 10/2019 | Crawford | B60P 3/20 |

\* cited by examiner

*Primary Examiner* — Anne Marie Antonucci

(57) ABSTRACT

A system and method for providing an autonomous delivery vehicle (ADV) incorporated with intelligent ramp control is disclosed. The ADV is configured to make decisions to deploy/retract the ramps depending on some conditions around the ADV. The ADV comprising a computing device including a means for executing artificial intelligence (AI) software, a ramp system comprising a plurality of ramps, and a sensor assembly in communication with the computing device to collect environmental data around the ADV. The data is communicated to the AI software, which is configured to analyze the environmental data to detect one or more obstacles proximate to the plurality of ramps of the ADV. Further, AI software determines a decision to deploy/retract at least one ramp based on the analysis and transmits the decision to the computing device. The computing device is configured to manipulate each ramp to deploy/retract based on the received decision.

13 Claims, 4 Drawing Sheets

SYSTEM AND METHOD FOR PROVIDING AN AUTONOMOUS DELIVERY VEHICLE WITH INTELLIGENT RAMP CONTROL

BACKGROUND OF THE INVENTION

A. Technical Field

The present disclosure generally relates to an autonomous vehicle. More specifically, the present invention relates to a system and method for providing an autonomous delivery vehicle (ADV) with intelligent ramp control.

B. Description of Related Art

Delivery services provide delivery and pickup of letters, packages, and parcels (hereinafter referred to as "packages") to and from residences and businesses across the country. There is a strong interest in using autonomous delivery vehicles (ADVs) for this delivery as it offers the promise of lower costs, increased reliability and more flexible delivery options. Many dense urban zones discourage and even prohibit large delivery vehicles. Further, many cities often include narrow streets and alleys that are not accessible to larger vehicles. To solve these and other cases, larger ADVs can carry smaller ADVs that are deployed for the last mile delivery. The larger ADV finds an acceptable, safe location outside the inaccessible locations to park, deploy its ramps and offload (or onboard in the case of retrieval) smaller ADVs for last mile delivery.

One method to load and unload smaller ADVs from a larger ADV is to use a ramp system. A ramp makes it easier to autonomously load and unload smaller ADVs. Ramps have a continuous surface, are foldable for transport and allow smaller ADVs to be transported further distances at higher speeds. However, while parking an ADV with a ramp system, several factors need to be considered. The ADV must find a safe and accessible parking spot to deploy and retract the ramps. Finding such spots in downtown areas is often very difficult.

A prior art, US 20150379468 A1 of Thomas Danaher Harvey discloses a method for delivery to multiple locations using autonomous vehicles. The method involves transporting the parcel with a first vehicle which is adapted to travel over the public roads to a transfer point. The parcel is then transferred to a second autonomous vehicle which transports the parcel over the final space and is not accessible by vehicles using the public roads. The secondary delivery vehicle is carried along with the parcel by the primary delivery vehicle and released at the transfer point to complete the delivery utilizing a ramp system.

Another prior art, WO2018024851 of Bowman Daniel et al discloses a vehicle for accommodating a number n≤N of delivery robots in a cargo compartment of the vehicle. An apparatus is provided for automatic loading and/or unloading with a controllable ramp and/or a controllable lifting system. This ramp is controlled by depending on a manual input of a driver of the vehicle or automatically dependent on the attainment of predetermined position.

Another prior art, WO2018024851 of Bowman Daniel et al discloses a vehicle having a loading device. This reference describes a vehicle having a loading space for receiving the delivery robot. The vehicle also has an apparatus with a controllable ramp and/or a controllable lifting system with automatic loading and/or unloading of the delivery robot. However, a solution for automation of decision regarding deployment/retraction of ramp depending upon the environmental conditions around the autonomous vehicle is not discussed. Also identifying a parking space that considers ramp deployment and loading and unloading of smaller ADVs and environmental conditions around the autonomous vehicle is not addressed by the above discussed prior art.

Thus, the present invention provides an autonomous delivery vehicle incorporated with intelligent ramp control for making decisions to deploy or retract the ramp based on some conditions prevailing around the autonomous delivery vehicle. Further, the present invention enables an autonomous delivery vehicle to find a parking space considering ramp deployment, loading and unloading of smaller ADVs, and environmental conditions around the autonomous vehicle.

SUMMARY OF THE INVENTION

A system and method to provide an autonomous delivery vehicle (ADV) incorporated with intelligent ramp control is disclosed. The system is configured to make decisions to deploy or retract the ramp depending on some conditions prevailing around the autonomous delivery vehicle. The autonomous delivery vehicle of the system is configured to find a parking space that allows for ramp deployment for loading and unloading of smaller ADVs while considering the environmental conditions around the ADV.

According to the present invention, the system comprises an autonomous delivery vehicle (ADV), and a cloud server. The ADV comprises a computing device including a means for executing artificial intelligence (AI) software, a communication system, a ramp system in communication with the computing device, a sensor assembly in communication with the computing device. In one embodiment, the ramp system comprises a plurality of ramps. The computing device is configured to manipulate each ramp to deploy or retract. The sensor assembly comprises one or more sensors to collect environmental data around the autonomous delivery vehicle. The collected environmental data enables the ADV to make decisions to deploy or retract each ramp. In one embodiment, the computing device comprises a memory for storing map data of a region for the ADV to locate a parking spot that allows for autonomous deployment of one or more ramps, environmental data collected by the sensors and data related to road boundaries, lane marking and signs. In another embodiment, the data stored in the memory of the computing device is communicated to a cloud server, which is in communication with the autonomous delivery vehicle.

In one embodiment, the operation of the autonomous delivery vehicle is disclosed as follows. Initially, the autonomous delivery vehicle is configured to a receive destination location of the smaller ADV. On arrival to an intermediate location that is proximate to the destination location or a hub, the autonomous delivery vehicle is configured to deploy the ramp. The smaller ADV exits via the ramp and travels to the final delivery location. To deploy the ramp, the autonomous delivery vehicle is configured to identify a parking space by analyzing the environmental data, considering space required for ramp deployment, loading and unloading of smaller ADV and environmental conditions around the autonomous vehicle. The analysis of environmental data also involves object or obstacle detection for intention, trajectory and clearance. Further, the autonomous delivery vehicle is configured to make decisions to deploy or retract the ramp depending on the conditions of environment around the autonomous delivery vehicle, or by detecting one or more obstacles, via one or more sensors, proximate to the plurality of ramps of the autonomous delivery vehicle.

In one embodiment, the present invention provides a method for identifying a parking space for safe and automatic deployment and retraction of ramp from the autonomous delivery vehicle is disclosed. In one step, an autonomous delivery vehicle comprises, a plurality of ramps, a computing device including a means for executing artificial intelligence (AI) software, and a sensor assembly. The sensor assembly and the plurality of ramps is in communication with the computing device. The sensor assembly comprising one or more sensors, is configured to collect environmental data around the autonomous delivery vehicle. In another step, the collected environmental data is transmitted to the computing device with the AI software. In another step, the AI software analyzes the environmental data to detect one or more obstacles proximate to the plurality of ramps of the autonomous delivery vehicle.

In another step, AI software determines a decision to deploy or retract at least one ramp based on the analysis. In another step, the AI software transmits the decision to the computing device, to manipulate at least one ramp. In another step, the ramp system deploys or retracts at least one ramp based on the decision received from the AI software, when the environment is safe or free from obstacles. At another step, if deployment of the ramp is restricted on reaching a destination location, the computing device, including the means for executing artificial intelligence (AI) software, is configured to navigate the autonomous delivery vehicle to find a location proximate to the destination location for deployment of ramp.

Other features and advantages will become apparent from the following description of the preferred embodiments, taken in conjunction with the accompanying drawings.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
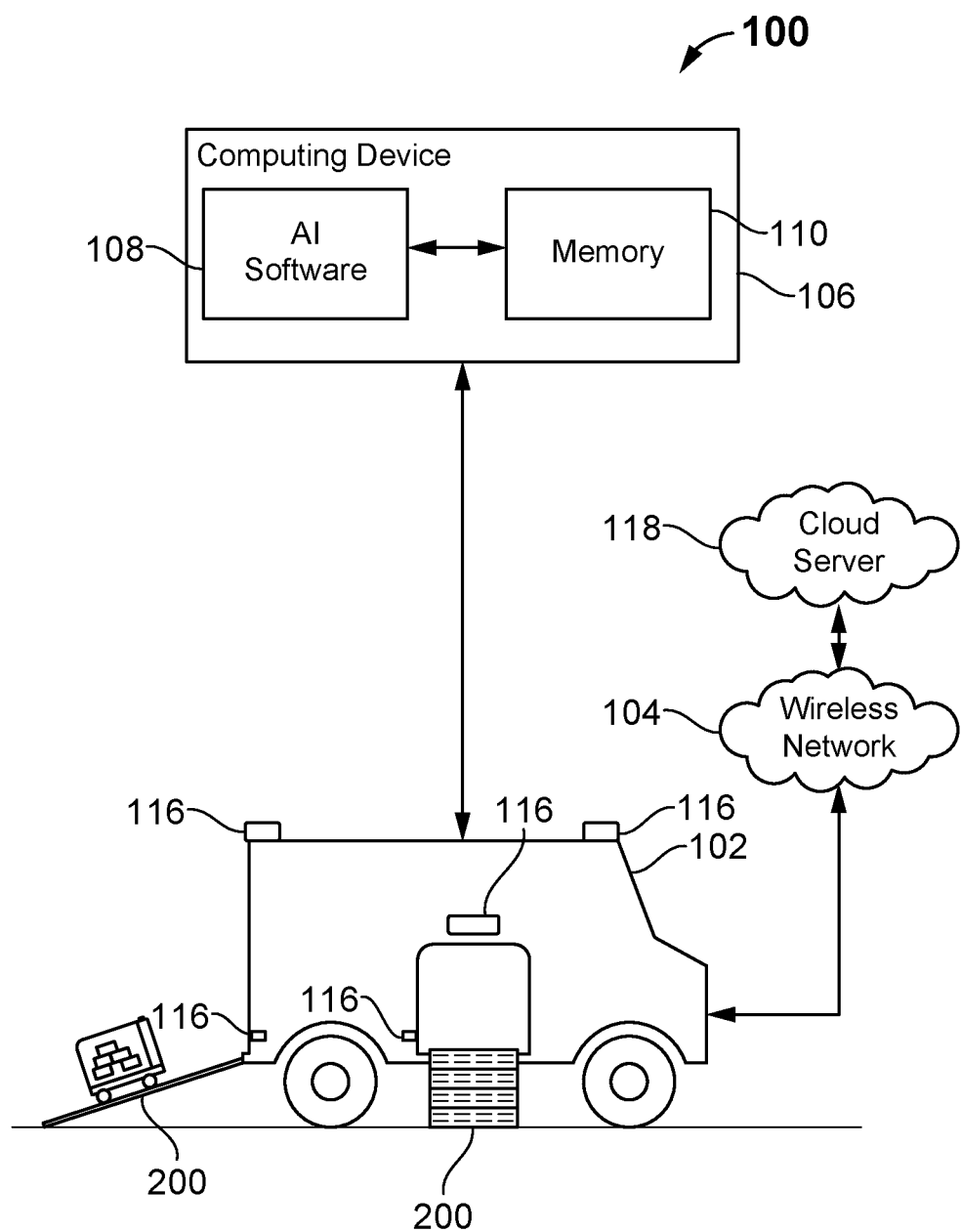
FIG. 1 shows an environment of an autonomous delivery vehicle with intelligent ramp control, according to an embodiment of the present invention.

FIG. 1 shows an environment 100 of a system comprising an autonomous vehicle incorporated with intelligent ramp control, according to an embodiment of the present invention. The system is configured to make decisions to deploy or retract the ramp depending on some conditions around the autonomous vehicle. The system is further configured to allow a larger ADV or ADV 102 to find a parking space further away from congested areas and deploy a smaller ADV for the last mile delivery. The ramp system enables a fully autonomous hub and spoke delivery system. The system comprises an autonomous vehicle in communication with a cloud server 118 via a wireless network 104.

In one embodiment, the autonomous vehicle is an autonomous delivery vehicle (ADV) 102. The autonomous delivery vehicle 102 comprises a computing device 106 executing artificial intelligence (AI) software/program 108, a ramp system comprising a plurality of ramps in communication with the computing device 106, a communication system, and a sensor assembly 116 in communication with the computing device 106. The computing device 106 is configured to manipulate each ramp to deploy or retract. The sensor assembly 116 comprises one or more sensors to collect environmental data around the autonomous delivery vehicle 102. The collected environmental data is communicated to the computing device 106.

In one embodiment, the computing device 106 is at least one of a general or special purpose computer. In some embodiments, it operates as a single computer, which can be a hardware and/or software server, a workstation, a desktop, a laptop, a tablet, a mobile phone, a mainframe, a supercomputer, a server farm, and so forth. In one embodiment, the wireless network 104 could be a global area network (GAN), such as the Internet, a wide area network (WAN), a local area network (LAN), or any other type of network or combination of networks. The network could be wired, wireless, or a combination of wired and wireless communication between systems, services, components, and/or devices on the wireless network 104.

In one embodiment, the computing device 106 comprises memory 110 that contains map data of a region for the ADV to locate parking areas that allows for autonomous deployment of one or more ramps. Upon arrival to the region, the ADV collects environmental data to determine a safe parking spot for ramp deployment. In another embodiment, the map data and environmental data collected by the sensors and data related to road boundaries, lane marking, and signs are stored in the cloud server 118, which is in communication with the autonomous delivery vehicle 102.

In one embodiment, the operation of the autonomous delivery vehicle 102 is disclosed as follows. Initially, the autonomous delivery vehicle 102 is configured to receive destination location of the smaller ADV. On arrival to an intermediate location that is proximate to the destination location, the autonomous delivery vehicle is configured to deploy the ramp once a safe parking spot is identified. The smaller ADV exits via the ramp and travels to the final delivery location. To deploy the ramp, the autonomous delivery vehicle 102 is configured to identify a parking space by analyzing the environmental data, while considering space required for ramp deployment, loading and unloading smaller ADV and environmental conditions around the autonomous vehicle. The analysis of environmental data involves object or obstacle detection for intention, trajectory and clearance. Further, the autonomous delivery vehicle 102 is configured to make decisions to deploy or retract the ramp depending on some conditions around the autonomous delivery vehicle 102 or by detecting one or more obstacles proximate to the plurality of ramps of the autonomous delivery vehicle 102.

In one embodiment, the ramp comprises plurality of ramp sections for storage within the autonomous delivery vehicle 102 and extendible therefrom. The ramp system further comprises a speaker assembly in communication with the computing device 106, configured to provide notification on manipulation of the ramp. In one embodiment, the sensor assembly 116 comprises one or more sensor, includes but not limited to, ultrasonic sensor, lidar sensor, a radar unit, an accelerometer sensor, a gyroscopic sensor, a compass sensor, camera and a stereo optical sensor.

In one embodiment, the autonomous delivery vehicle 102 comprises a plurality of storage spaces to secure at least one smaller autonomous delivery vehicle. In one embodiment, the autonomous delivery vehicle (ADV) 102 is adapted to travel over the public roads to the destination location. In one embodiment, the smaller ADV is adapted to travel over the public roads to transport the parcel to the destination location. In some embodiments, the parcel could be any one or more commodities, but not limited to food, groceries, clothes or electronic devices. The smaller autonomous delivery vehicle receives a signal to move via the ramp system. In one embodiment, the ADV 102 is configured to send signals to the smaller autonomous delivery vehicle on deployment of the ramp. In response to the transmitted signals, the smaller autonomous delivery vehicle decides either to load or unload from the ADV 102.

In one embodiment, the autonomous delivery vehicle 102 and smaller autonomous delivery vehicle is in communication with the computing device 106. In one embodiment, the computing device 106 comprises a memory 110 for storing map data used by the autonomous delivery vehicle 102, environmental data collected by the sensors and data related to road boundaries, lane marking and signs and data relating to the smaller ADV. In one embodiment, if deployment of a ramp is restricted on reaching a destination location or a hub, the computing device 106 is configured to navigate the autonomous delivery vehicle 102 to find a suitable parking spot or location proximate to the destination location for deployment of one or more ramp.

Figure 2:
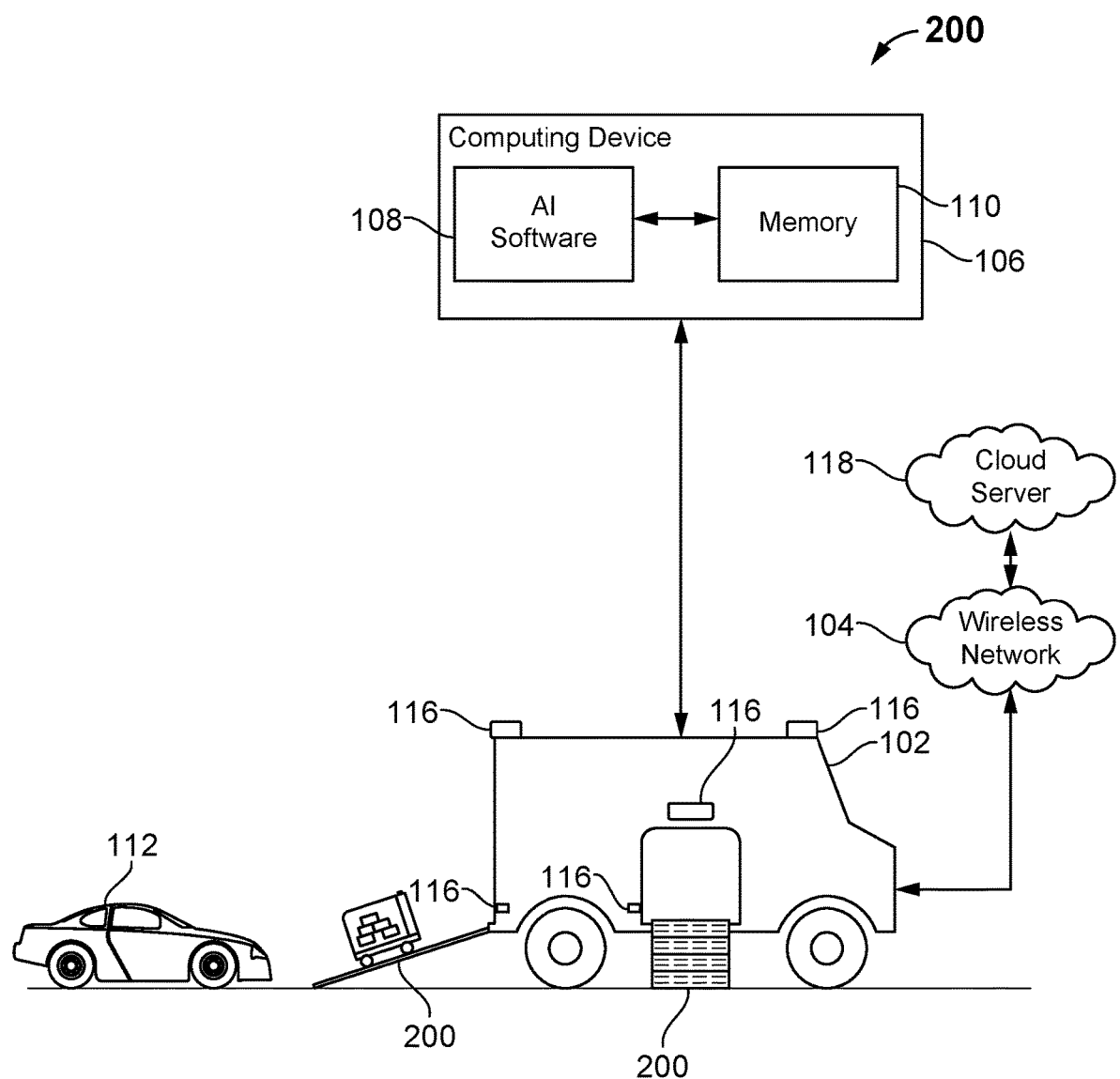
FIG. 2 shows an environment of the autonomous delivery vehicle with intelligent ramp control for deploying ramp, based on an environmental condition around the autonomous vehicle, according to an embodiment of the present invention.

FIG. 2 shows an environment 200 of the autonomous delivery vehicle 102 with intelligent ramp control deploying ramps, based on an environmental condition around the autonomous delivery vehicle (ADV) 102, in an embodiment of the present invention. In one embodiment, the memory 110 comprises map data about roads, lanes, boundaries and obstacles. Additionally, the memory 110 may be accessible by the AI 108. In one embodiment, the memory 110 unit is integrated into the computing device 106. In some embodiments, the memory 110 is configured to store and organize certain data by the computing device 106. The environmental data obtained from the sensors of the autonomous delivery vehicle 102 is transferred to the computing device 106. The computing device 106 executes the artificial intelligence program 108 combines the sensor data and map data to decide a parking location that does not block deployment of ramp. Further, based on the analyzed data, the artificial intelligence program 108 transmits a decision to the computing device 106 to deploy at least one ramp which is not blocked by any obstacles 112.

Figure 3:
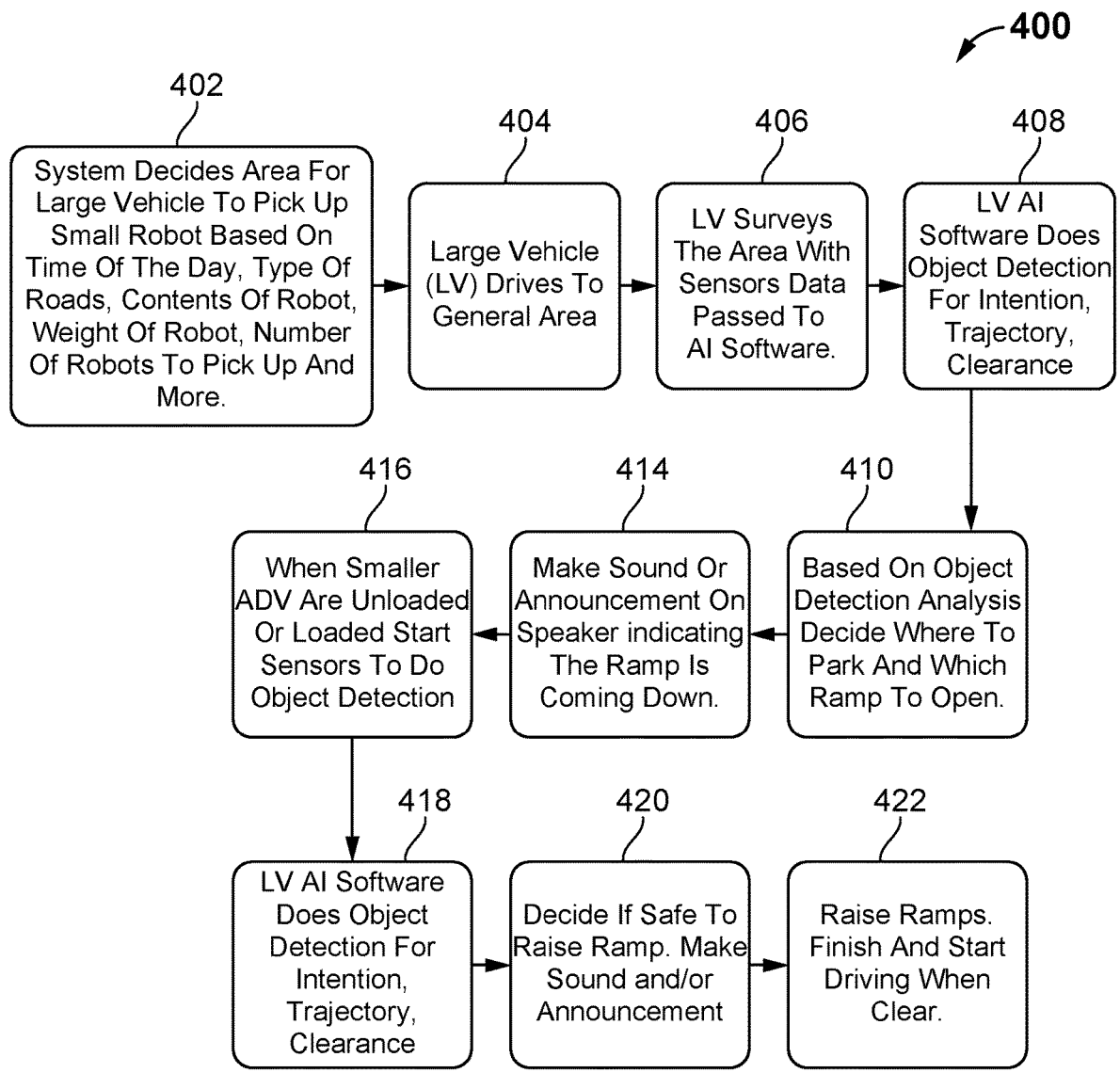
FIG. 3 shows a flowchart illustrating deployment and retraction of ramp from the autonomous delivery vehicle utilizing intelligent ramp control, according to an embodiment of the present invention.

Still, referring to FIG. 2, the autonomous delivery vehicle 102 comprises plurality of ramps, wherein at least one ramp is disposed on rear side of the ADV 102, at least one ramp is disposed on right side of the ADV 102, at least one ramp is disposed on left side of the ADV 102. If an obstacle 112 is detected at the rear side of the ADV 102 restricting deployment of ramp, the AI software 108 transmits a decision to deploy the ramp at any one or both sides of the ADV 102. In some embodiment, the computing device 106 commands the autonomous delivery vehicle 102 to drive in-route to drop off or pick up the other smaller autonomous delivery vehicle via the ramp system FIG. 3 shows a flowchart 400 illustrating deployment and retraction of ramp of the autonomous delivery vehicle utilizing an intelligent ramp control in an embodiment of the present invention. At step 402, the cloud server 118 transmits data relating to an area to the autonomous delivery vehicle 102, or large vehicle to pick up smaller autonomous vehicle or small vehicle. In one embodiment, the data includes time, weight of small ADV vehicle, the number of small vehicles that need to be picked up, and type of road. At step 404, the autonomous delivery vehicle 102 drives towards its destination location specified by cloud server 118. The autonomous delivery vehicle 102 includes a ramp system comprising, a plurality of ramps; a computing device 106 executing artificial intelligence (AI) program 108 in communication with the plurality of ramps configured to manipulate each ramp; a sensor assembly 116 in communication with the computing device 106 comprising one or more sensors, and a communication system in communication with the computing device 106. The computing device 106 is configured to manipulate each ramp to deploy or retract.

At step 406, the sensor is configured to collect environmental data around the autonomous delivery vehicle 102. The collected environmental data is transmitted to the AI software 108. At step 408, the AI software 108 analyzes the environmental data to detect one or more obstacles proximate to the plurality of ramps of the autonomous delivery vehicle 102. The AI software 108 analyses the environmental data to detect one or more obstacle for intention, trajectory and clearance.

Figure 4:
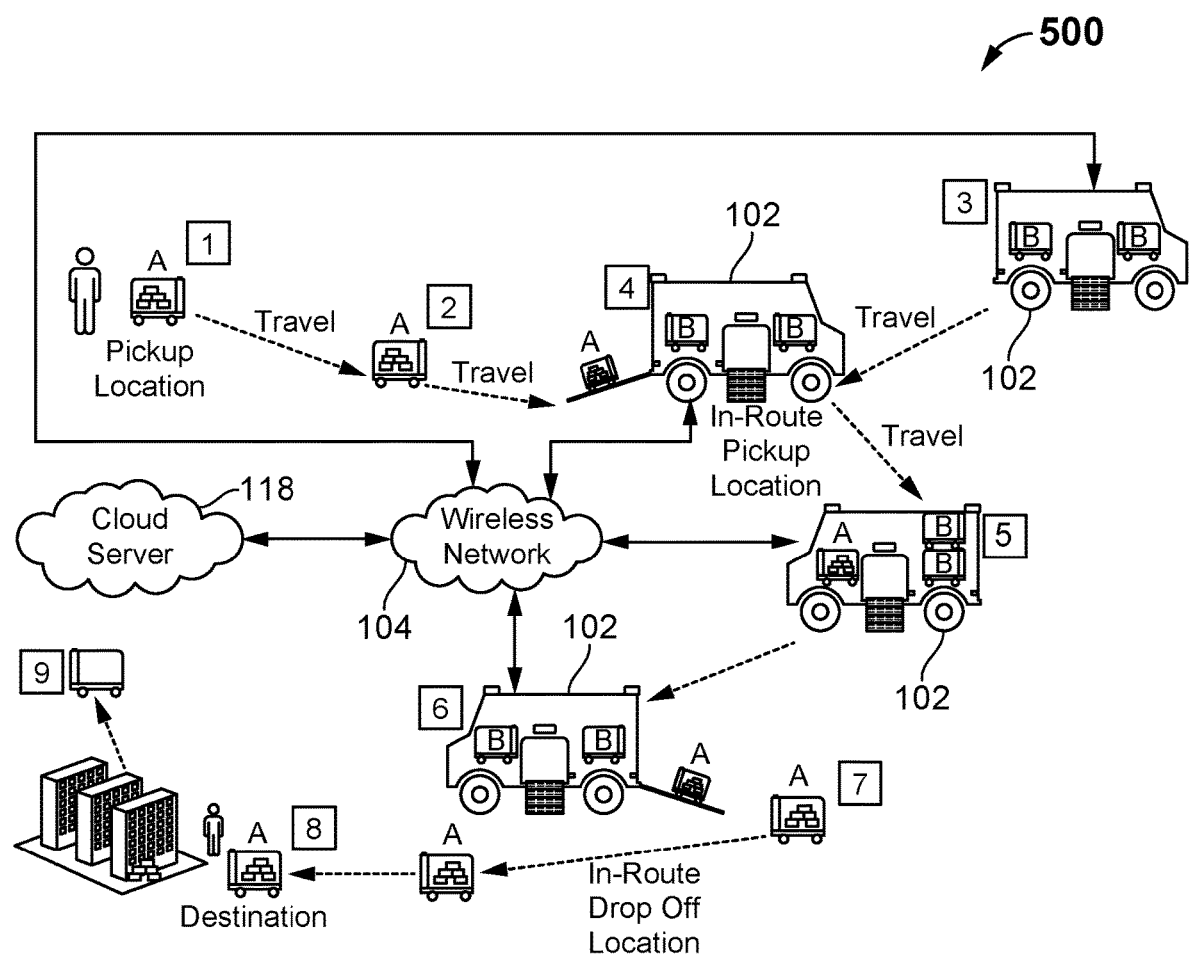
FIG. 4 illustrates an environment of the autonomous delivery vehicle deploying and/or retracting the ramp system for loading and unloading smaller ADV, according to an embodiment of the present invention.

At step 410, the AI software 108 determines a decision to deploy or retract at least one ramp based on the analysis. The AI software 108 transmits the decision to the computing device 106 to manipulate at least one ramp. The ramp system deploys or retracts at least one ramp based on the decision received from the AI software 108. At step 412, a notification is given on deploying the ramp. At step 416, when the autonomous vehicle is unloaded or loaded, one or more sensors are activated again for obstacle detection. At step 418, the AI software 108 determines a decision to retract at least one ramp based on the analysis of sensor data. At step 420, when the environment around the autonomous delivery vehicle 102 is safe to retract the ramp, a notification is given via the speaker assembly. At step 422, the ramp is retracted and the autonomous delivery vehicle 102 continues to its next destination. Further, the computing device 106 commands the autonomous delivery vehicle 102 to drive the route to drop off or pick up other smaller autonomous delivery vehicle via the ramp system FIG. 4 illustrates an environment 500 of the autonomous delivery vehicle 102 deploying and/or retracting the ramp system for loading and unloading the smaller ADV, according to an embodiment of the present invention. For an example, a smaller autonomous delivery vehicle (A, B) incorporated with a storage container to deliver or pick up goods from location is deployed, referred with number 1, 2, 3, 5. In this scenario, the autonomous delivery vehicle 102 transports the smaller autonomous delivery vehicles to a distribution point, referred as 6, 7, 8, wherein the smaller autonomous delivery vehicle exits, autonomously, and leaves to delivery or pick up goods. With reference to above-mentioned description of the figures, the computing device 106 commands the autonomous delivery vehicle 102 to drive to in-route pickup location where the smaller autonomous vehicle (called vehicle A) autonomously enters the larger autonomous delivery vehicle 102. Once vehicle A is inside, the autonomous delivery vehicle 102 travels at a higher speed towards the destination of vehicle A. The computing device 106 may make various stops along the route to drop off or pick up other smaller autonomous delivery vehicle via the ramp system. The computing device 106 directs the autonomous vehicle 102 to an in-route drop off location for vehicle A. Once there, vehicle A autonomously exits and autonomous delivery vehicle 102 and then continues to its final destination.

The foregoing description comprises illustrative embodiments of the present invention. Having thus described exemplary embodiments of the present invention, it should be noted by those skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An autonomous vehicle incorporated with intelligent ramp control, the autonomous vehicle being an autonomous delivery vehicle and comprising:
    at least one small autonomous delivery vehicle;
    a plurality of storage spaces to secure at least one small autonomous delivery vehicle;
    a computing device executing artificial intelligence (AI) program;
    a ramp system disposed on the autonomous vehicle, comprising a plurality of ramps, and
    a sensor assembly in communication with the computing device comprising one or more sensors configured to collect environmental data around the autonomous vehicle, wherein the computing device comprises:
    a memory storing the artificial intelligence (AI) program; and
    a processor executing the artificial intelligence (AI) program to:
    receive the collected environmental data of the sensor,
    analyze the environmental data to detect one or more obstacles proximate to the plurality of the ramps of the autonomous vehicle,
    determine a decision to deploy or retract at least one ramp based on the analysis, and
    manipulate the at least one ramp base on the decision;
    wherein if deployment of one of the plurality of the ramps is restricted on reaching a destination location, the computing device navigates the autonomous delivery vehicle to find a location proximate to the destination location for deployment of the one of the plurality of the ramps.

2. The autonomous vehicle of claim 1, wherein each of the plurality of the ramps comprises a plurality of ramp sections for storage within a vehicle and extendible therefrom.

3. The autonomous vehicle of claim 1, wherein the analysis of environmental data involves object detections for intention, trajectory and clearance.

4. The autonomous vehicle of claim 1, wherein the ramp system comprises a speaker assembly which is in communication with the computing device and is configured to provide notification on manipulation of the ramp.

5. The autonomous vehicle of claim 1, wherein the sensors comprise at least one of ultrasonic sensor, lidar sensor, a radar unit, an accelerometer sensor, a gyroscopic sensor, a compass sensor and a stereo optical sensor.

6. The autonomous vehicle of claim 1, wherein the autonomous delivery vehicle and the at least one small autonomous delivery vehicle are in communication with the computing device.

7. The autonomous vehicle of claim 1, wherein the memory comprises 3D HD map data and data related to road boundaries, lane markings and signs.

8. The autonomous vehicle of claim 1, wherein the at least one small autonomous delivery vehicle receives a signal to move via the ramp system.

9. A method for an autonomous vehicle with intelligent ramp control, the autonomous vehicle being an autonomous delivery vehicle, the autonomous vehicle, comprising:
    at least one small autonomous delivery vehicle;
    a plurality of storage spaces to secure at least one small autonomous delivery vehicle;
    a ramp system comprising a plurality of ramps;
    a computing device in communication with the plurality of ramps; and a sensor assembly in communication with the computing device comprising one or more sensors configured to collect environmental data around the autonomous delivery vehicle, and transmit the collected environmental data to the computing device,
    wherein the method is performed in the computer device comprising:
    analyzing the environmental data to detect one or more obstacles proximate to the plurality of ramps of the autonomous delivery vehicle;
    determining a decision to deploy or retract at least one ramp based on the analysis; and
    deploying or retracting at least one ramp based on the decision;
    wherein if deployment of one of the plurality of ramps is restricted on reaching a destination location, navigating the autonomous delivery vehicle to find a location proximate to the destination location for deployment of the one of the plurality of ramps.

10. The method of claim 9, wherein one of the plurality of the ramps comprises a plurality of ramp sections for storage within a vehicle and extendible therefrom.

11. The method of claim 9, wherein the analysis of environmental data involves object detections for intention, trajectory and clearance.

12. The method of claim 9, wherein the autonomous delivery vehicle comprises a speaker assembly in communication with the computing device, the method further comprises: controlling the speaker to generate notification on manipulation of the ramp.

13. The method of claim 9, wherein the sensors comprises at least one of ultrasonic sensor, lidar sensor, a radar unit, an accelerometer sensor, a gyroscopic sensor, a compass sensor, and a stereo optical sensor.

\* \* \* \* \*